(12) United States Patent
Schwanke et al.

(10) Patent No.: US 9,334,818 B2
(45) Date of Patent: May 10, 2016

(54) MIXED-MODE COMBUSTION CONTROL

(71) Applicant: Robert Bosch GmbH, Stuttgart (DE)

(72) Inventors: Jason Schwanke, Southfield, MI (US); Anna Stefanopoulou, Ann Arbor, MI (US); Li Jiang, Ann Arbor, MI (US); Jeffrey S. Sterniak, Canton, MI (US); Nikhil Ravi, Mountain View, CA (US); Joel Oudart, Sunnyvale, CA (US); Erik Hellstrom, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 14/221,989

(22) Filed: Mar. 21, 2014

(65) Prior Publication Data

US 2014/0283800 A1 Sep. 25, 2014

Related U.S. Application Data

(60) Provisional application No. 61/804,252, filed on Mar. 22, 2013, provisional application No. 61/832,432, filed on Jun. 7, 2013.

(51) Int. Cl.
| | |
|---|---|
| *F02D 41/00* | (2006.01) |
| *F02M 25/07* | (2006.01) |
| *F02D 41/14* | (2006.01) |
| *F02D 35/02* | (2006.01) |
| *F02D 13/02* | (2006.01) |
| *F02D 41/18* | (2006.01) |
| *F02B 1/12* | (2006.01) |

(52) U.S. Cl.
CPC ........ *F02D 41/0062* (2013.01); *F02D 13/0203* (2013.01); *F02D 35/023* (2013.01); *F02D 41/1401* (2013.01); *F02D 41/144* (2013.01); *F02D 41/1454* (2013.01); *F02M 25/0727* (2013.01); *F02M 25/0752* (2013.01); *F02B 1/12* (2013.01); *F02D 41/18* (2013.01); *F02D 2041/001* (2013.01); *F02D 2041/1433* (2013.01); *F02D 2200/0406* (2013.01); *Y02T 10/18* (2013.01); *Y02T 10/47* (2013.01)

(58) Field of Classification Search
CPC ..... F02D 41/00; F02D 41/18; F02D 41/0062; F02D 41/1401; F02D 41/144; F02D 41/1454; F02D 2200/0406; F02M 25/07; F02M 25/0727; F02M 25/0752; Y02T 10/47; Y02T 10/18
See application file for complete search history.

(56) References Cited

U.S. PATENT DOCUMENTS

| | | | | | |
|---|---|---|---|---|---|
| 5,918,577 | A | * | 7/1999 | Martelli | ................. F02B 17/00 123/568.14 |
| 5,960,755 | A | * | 10/1999 | Diggs | ................. F01L 13/0036 123/568.14 |

(Continued)

FOREIGN PATENT DOCUMENTS

EP 1460253 9/2004

*Primary Examiner* — Hieu T Vo
(74) *Attorney, Agent, or Firm* — Michael Best & Friedrich LLP

(57) ABSTRACT

Methods and systems are described for controlling engine combustion during a mixed-mode combustion modality. A target exhaust valve timing is determined based on a first combination of engine speed and load. An amount of trapped residual in an engine cylinder after an exhaust valve is closed during a first combustion cycle is also determined. Based at least in part on the amount of trapped residual, an amount of gas that will be drawn into the engine cylinder when the intake valve is opened during a second combustion cycle is determined. The target exhaust valve timing is then adjusted during the second combustion cycle in order to adjust the amount of gas that will be drawn into the engine cylinder when the intake valve is opened during a third combustion cycle.

16 Claims, 9 Drawing Sheets

(56) References Cited

U.S. PATENT DOCUMENTS

| | | |
|---|---|---|
| 7,168,420 B1 | 1/2007 | Yang |
| 7,213,566 B1 | 5/2007 | Jankovic |
| 7,213,572 B2 | 5/2007 | Yang |
| 7,234,438 B2 | 6/2007 | Yang |
| 2011/0180035 A1 | 7/2011 | Durrett |
| 2011/0295487 A1 | 12/2011 | Ramappan et al. |
| 2013/0073173 A1 | 3/2013 | Hellstrom et al. |

* cited by examiner

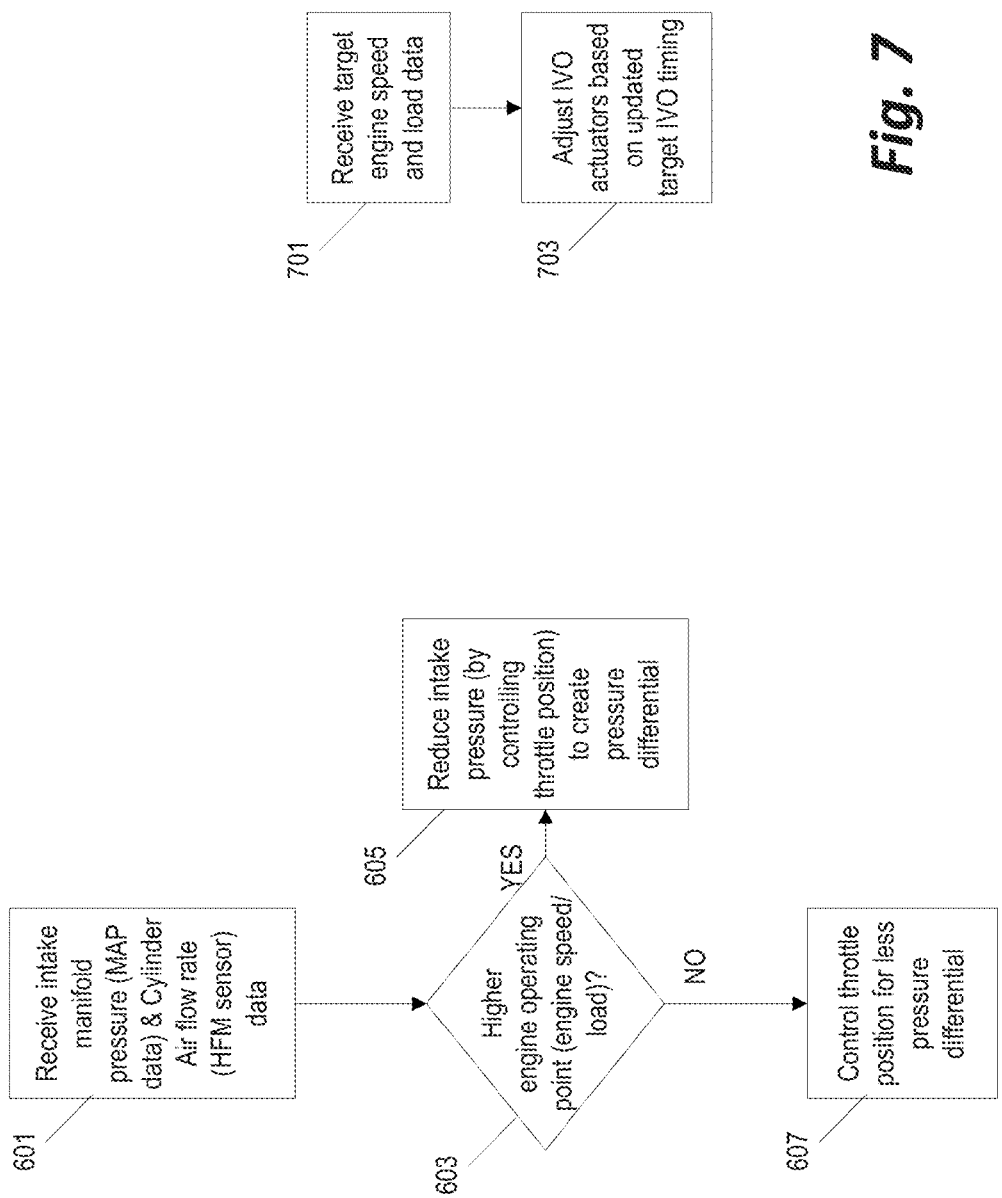

US 9,334,818 B2

MIXED-MODE COMBUSTION CONTROL

RELATED APPLICATIONS

This application claims the benefit of U.S. Provisional Patent Application No. 61/804,252, filed Mar. 22, 2013, and U.S. Provisional Patent Application No. 61/832,432, filed Jun. 7, 2013, both entitled "MIXED-MODE COMBUSTION CONTROL," the entire contents of both of which are incorporated herein by reference.

BACKGROUND

The present invention relates to systems and methods for controlling combustion in an internal combustion engine such as, for example, a vehicle engine.

SUMMARY

During spark-assisted compression ignition (SACI) combustion, a spark initiates a reaction kernel before the main combustion event. The propagating flame then consumes a portion of the charge and releases fuel energy so the remainder of the charge ignites earlier than it would have otherwise. As a result, SACI combustion, as shown in FIGS. 1 and 2, has a slower heat release rate compared to Homogeneous Charge Compression Ignition (HCCI), and a faster heat release rate comparing with Spark Ignition (SI).

SACI combustion, while bridging the gap between low-temperature auto-ignition and conventional spark ignition, creates challenges for combustion control because the combustion performance cannot be represented by a single feature following a one-to-one relationship. For example, under other combustion modalities, combustion might be controlled by utilizing a single feature, such as crank angle at 50% mass fraction burn (MFB50), to characterize the combustion phasing performance. However, during a mixed-mode combustion, such as spark-assisted compression ignition ("SACI") combustion, combustion phasing cannot be fully characterized with a single combustion feature. As shown in FIG. 3, both combustion event has the same crank angle of 50%, the behaviors of these two combustion events are distinct.

In one embodiment, the invention provides a method of controlling engine combustion. A target exhaust valve timing is determined based on a first combination of engine speed and load. An amount of trapped residual in an engine cylinder after an exhaust valve is closed during a first combustion cycle is also determined. Based at least in part on the amount of trapped residual, an amount of gas that will be drawn into the engine cylinder when the intake valve is opened during a second combustion cycle is determined. The target exhaust valve timing is then adjusted during the second combustion cycle in order to adjust the amount of gas that will be drawn into the engine cylinder when the intake valve is opened during a third combustion cycle.

In another embodiment, the invention provides a combustion control system that includes a processor and a memory. The system determines a target exhaust valve timing based on a first combination of engine speed and load. The system also determines an amount of trapped residual in an engine cylinder after an exhaust valve is closed during a first combustion cycle. Based at least in part on the amount of trapped residual, the system determines an amount of gas that will be drawn into the engine cylinder when the intake valve is opened during a second combustion cycle. The system adjusts the target exhaust valve timing during the second combustion cycle to adjust the amount of gas that will be drawn into the engine cylinder when the intake valve is opened during a third combustion cycle.

In yet another embodiment, the invention provides a method of controlling engine torque. An amount of fresh charge is determined that will be necessary to be drawn into an engine cylinder during a subsequent combustion to achieve a target engine torque. An amount of trapped residual in an engine cylinder after an exhaust valve is closed during a previous combustion cycle is also determined. Based at least in part on the amount of trapped residual, an amount of fresh charge drawn into the cylinder when an intake valve is opened during a current combustion cycle is determined. The timing of the exhaust valve closing during the current combustion cycle is then adjusted such that the amount of trapped residual in the engine cylinder after the exhaust valve is closed during the current combustion cycle is sufficient to allow the necessary amount of fresh charge to be drawn into the engine cylinder during the subsequent combustion cycle.

Other aspects of the invention will become apparent by consideration of the detailed description and accompanying drawings.

BRIEF DESCRIPTION OF THE DRAWINGS

FIG. 6 is a flowchart of a method of controlling the intake pressure according to the control structure of FIG. 5.

FIG. 7 is a flowchart of a method of controlling intake valve timing according to the control structure of FIG. 5.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Various combustion modalities can be implemented to control the operation of an internal combustion engine. The most common is "spark ignition" in which fuel is injected into a cylinder and a spark is used to ignite the fuel. In homogeneous charge compression ignition (HCCI) combustion, fuel is injected and ignited due to temperature and pressure within the cylinder—no spark is used.

Spark-assisted compression ignition (SACI) is a mixed-mode combustion modality in which an engine cylinder experiences more than one combustion event. A spark is used to initiate a reaction and consume a portion of the charge. Later during the combustion cycle, the remainder of the charge ignites due to pressure and temperature in the engine cylinder. The partial-spark ignition changes the conditions within the engine such that the compression ignition occurs more quickly than it would under HCCI combustion.

A SACI combustion cycle can be characterized using a double-Wiebe function as described in U.S. Provisional Patent Application No. 61/804,252, which is incorporated herein by reference. The first Wiebe function component models the spark-ignited combustion component while the second Wiebe function component models the autoignition combustion component. A proper double-Wiebe function is defined using a least-squares algorithm to fit two Wiebe functions to difference ranges of a heat release curve (defined based on measurable cylinder pressures).

During real-time vehicle operation, an engine control unit can utilize a defined double-Wiebe model to characterize engine combustion based on a sub-set of parameters. Based on these parameters, the combustion controller can adjust the operation of the engine to achieve optimum operational conditions. For example, the combustion controller can adjust an ignition angle and exhaust valve phasing to obtain an optimal CA50 point and, therefore, generate optimum torque. The combustion controller can also coordinate operation with an externally cooled exhaust gas recirculation (cEGR) system to generate a desired heat release rate and to achieve engine conditions that support partial auto-ignition during mixed mode operation. Rather than calculate the double-Wiebe model in real-time, the appropriate engine actuator settings can be defined by a look-up table stored to a memory and adjusted based on feedback mechanisms (e.g., a proportional-integral-derivative (PID) controller).

Figure 1:
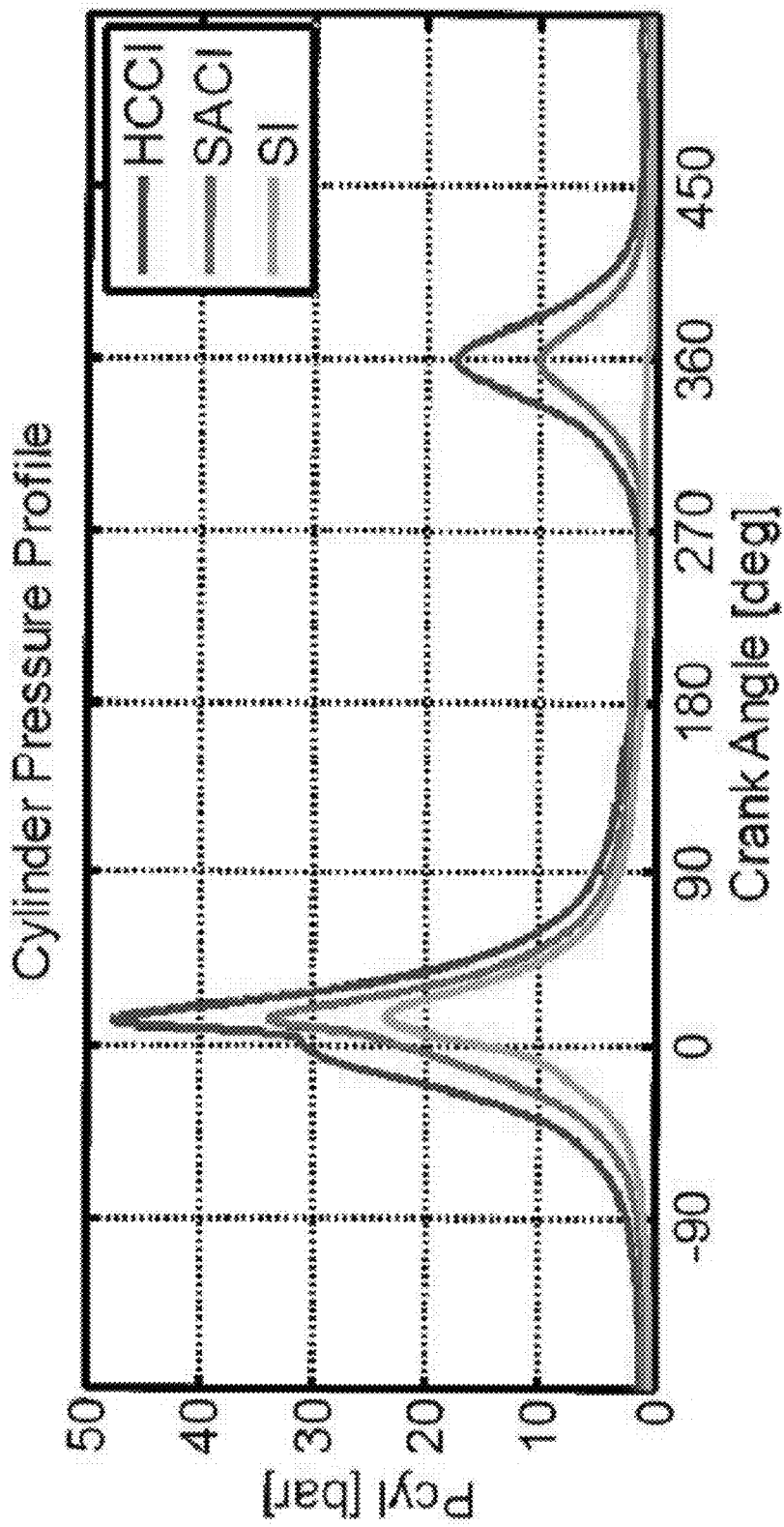
FIG. 1 is a graph comparing cylinder pressure evolution during homogeneous charge compression ignition (HCCI), spark-assisted compression ignition (SACI), and spark ignition (SI).
Figure 2:
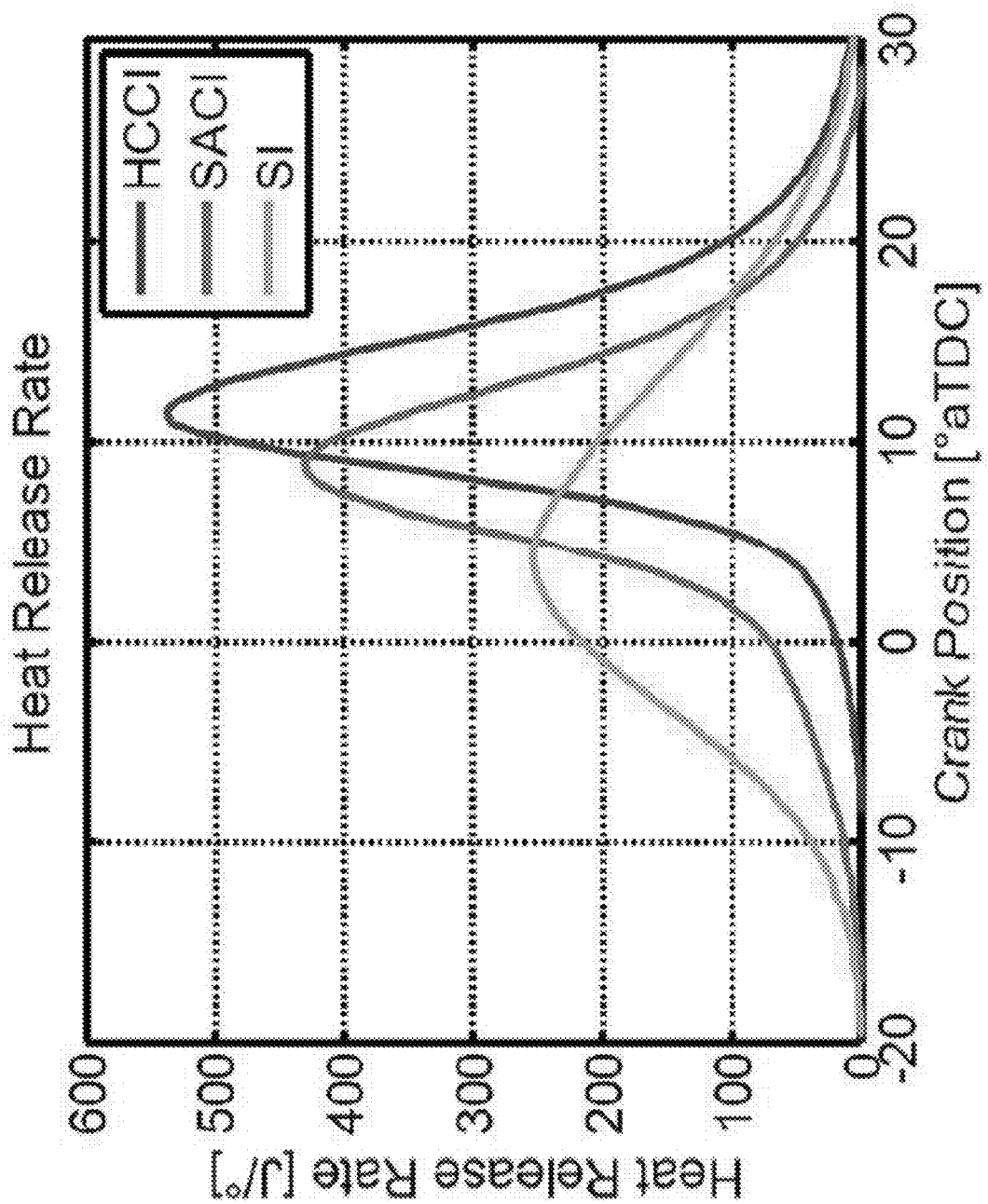
FIG. 2 is a graph comparing heat release rate evolution during homogeneous compression ignition (HCCI), spark-assisted compression ignition (SACI), and spark ignition (SI).
Figure 3:
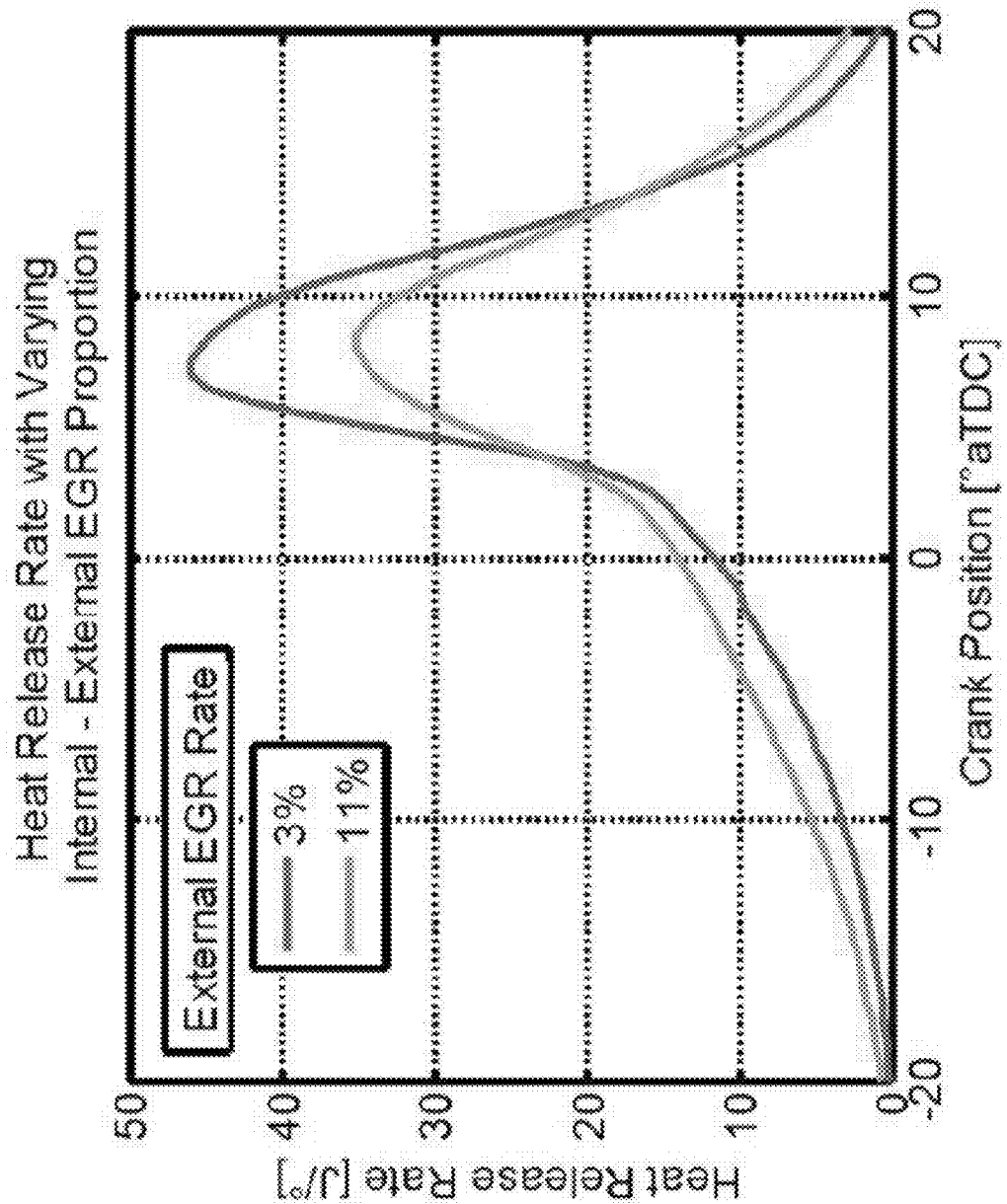
FIG. 3 is a graph of the heat release rate of an engine cylinder during spark-assisted compression ignition (SACI) with two different external exhaust gas recirculation (EGR) rates.
Figure 4:
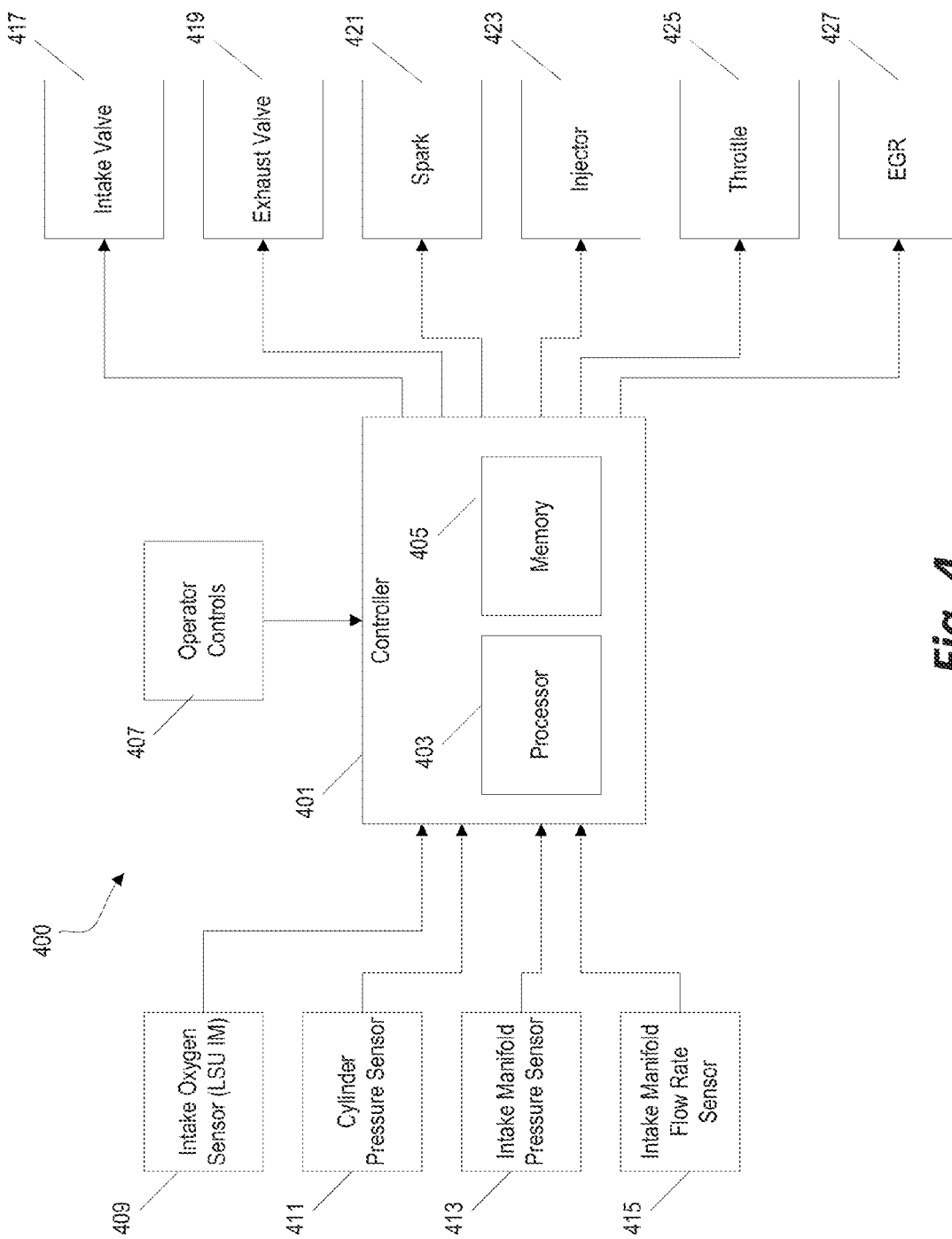
FIG. 4 is a block diagram of a combustion control system.

FIG. 4 illustrates one example of an engine combustion control system 400 that can be used to implement a mixed-mode combustion modality such as SACI combustion. It is noted that the same combustion control system can be used to implement spark ignition (SI) combustion and HCCI combustion and, in some constructions, the combustion control system 400 will transition between different combustion modalities depending upon the operating point of the engine.

The engine combustion control system 400 includes a controller 401. The controller 401 includes a processor and a non-transitory computer readable memory 405. The memory 405 stores instructions that are executed by the processor 403 to control the operation of the processor 403. The memory 405 also stores various look-up tables as discussed in further detail below. In other constructions, the controller 401 can be implemented in a number of other ways including, for example, an application specific integrated circuit (ASIC).

The controller 401 receives data from operating controls 407 of the vehicle including, for example, an accelerator pedal, a cruise control system, and a braking system. Based on this information, the controller 401 is able to determine various vehicle operating parameters including a requested engine torque, engine speed, etc. The control 401 also receives input data from a variety of sensor configured to monitor various engine conditions. For example, an intake oxygen sensor 409 (e.g., LSU IM sensor) measures the oxygen content of the air at the intake manifold of the engine and provides a signal indicative thereof of the controller 401. A number of cylinder pressures sensors 411 measure the pressure inside each cylinder of the engine. An intake manifold pressure sensor 413 (e.g, a MAP sensor) measures the pressure of the air at the intake manifold and an intake manifold flow rate sensor 415 (e.g, a HFM sensor) measures the flow rate of air passing through the intake manifold of the engine. Various other sensor may also be coupled to the controller 401 to provide other information regarding the operating state of the engine.

The controller 401 is also coupled to a number of engine actuators. By controlling these actuators, the controller 401 is able to control the operation and performance of the engine. As illustrated in FIG. 4, these engine actuators include an intake valve 417, an exhaust valve 419, a spark source 421, a fuel injector 423, a throttle 425, and an EGR system 427.

The engine control system 400 illustrated in FIG. 4 is just one example of a control system that can be used to implement mixed-mode combustion. As such, in other constructions, the layout and configuration of components may be different. For example, FIG. 4 illustrates the various sensors and engine actuators each directly connected to the controller 401. However, other constructions may include a controller area network (CAN) bus which provides for communication between various system components.

Figure 5:
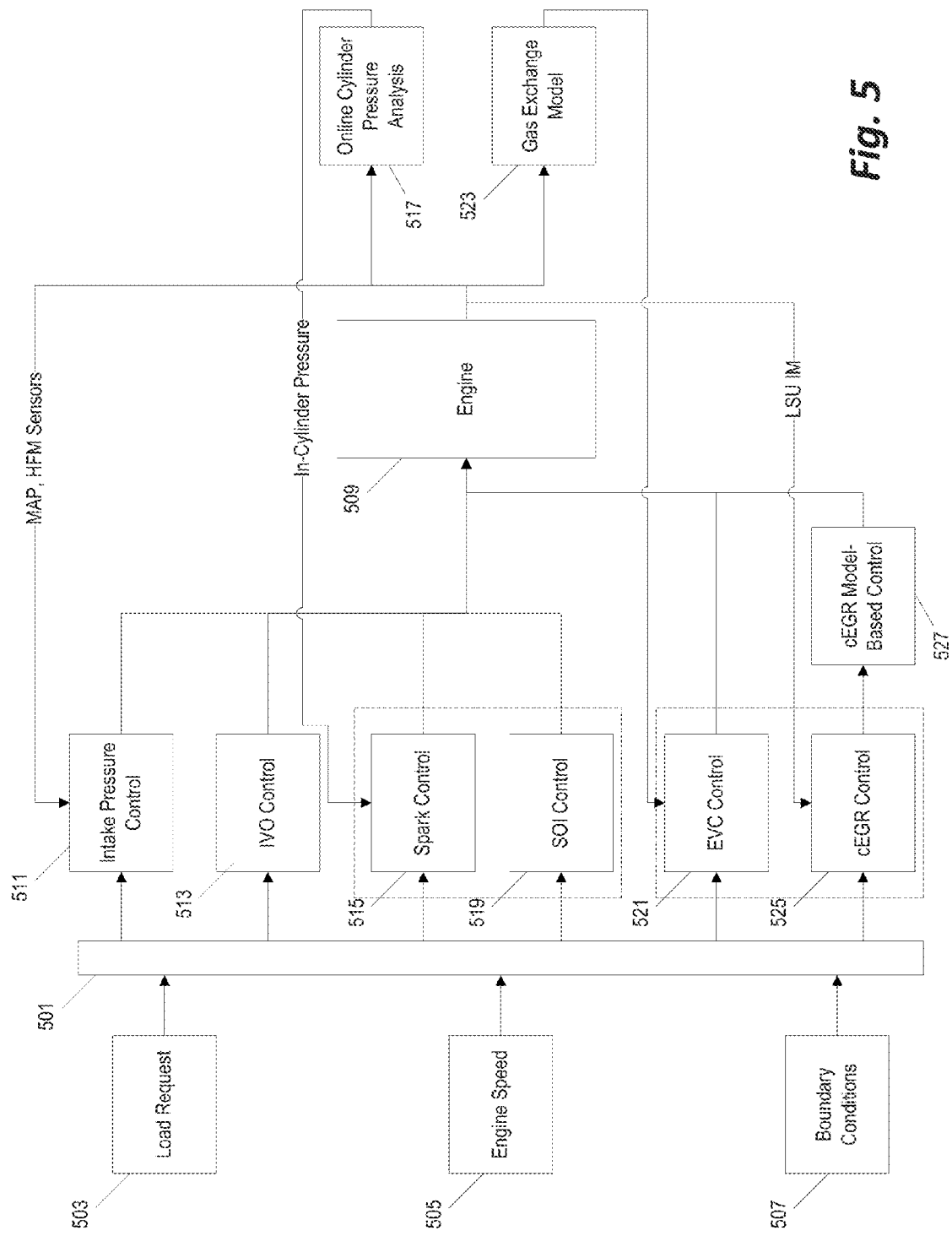
FIG. 5 is a schematic diagram of a control structure implemented by the combustion control system of FIG. 4.

FIG. 5 illustrates an example of a control structure implemented by the control system of FIG. 4 in order to regulate and control engine operation under SACI combustion. A bus 501 is shown which provides information that is available to the various components and modules of the controller 401. For example, the bus 501 provides the requested engine load/torque 503, the engine speed 505, and various other boundary conditions 507. However, the example of FIG. 5 is illustrative of the operation of the control system—actual constructions may or may not include a physical bus.

A number of control modules analyze information from the bus 501 and provide control settings to the vehicle engine 509. As described above in reference to FIG. 4, these modules can be implemented by software instructions stored on the non-transitory memory of the controller. Furthermore, in the system of FIG. 4, the control settings are applied to the vehicle engine 509 by manipulating one or more engine actuators. The intake pressure control module 511 controls the intake pressure of the engine by adjusting the throttle. The intake valve opening (IVO) controller 513 adjusts the intake valve timing of the engine to control the point during a combustion cycle at which the intake valve of a cylinder is opened. The spark controller 515 controls spark timing for each cylinder based in part on the measured cylinder pressure from the "online cylinder pressure analysis" module 517. The SOI (start of injection) controller 519 adjusts the fuel injection timing. Because the spark timing and the injection timing both affect the combustion phasing of the engine, operation of the spark controller 515 and the SOI controller 519 are coordinated as described in further detail below.

The EVC controller 521 controls the timing of the exhaust valve based on a gas exchange model 523 implemented by the control system. As described in further detail below, the control structure of FIG. 5 regulates the engine load/torque primarily by controlling the exhaust valve timing as opposed to other combustion control structures where engine load/torque is controlled primarily by adjusting the throttle. The EVC controller 521 operates in coordination with a cEGR controller 525 which controls the amount of exhaust gas that is recirculated into the intake manifold according to a model-based control strategy 527.

FIG. 6 illustrates the operation of the intake pressure control module 511 as implemented by the controller 401. Unlike other systems in which the throttle is adjusted to control the engine load/torque, the intake pressure control module 511 in this system maintains the engine in a mostly un-throttled state. Instead, the throttle used to maintain a slight vacuum to allow for flow of high pressure cooled exhaust gas recirculation (cEGR). In this example, the pressure vacuum at the intake manifold is maintained at no more that 50-70 mBar and the intake pressure is regulated to approximately 950 mBar. However, as illustrated in FIG. 6, this value can vary depending on the operating point of the engine.

The controller 401 receives data from the intake manifold pressure sensor (i.e., the "MAP sensor") and air flow rate data from the HFM sensor (step 601). Based on the current engine operating point (i.e., the engine speed and load), the intake pressure control module 511 determines a target intake pressure from a look-up table stored in memory (step 603). As illustrated in FIG. 6, at higher engine operating points, the intake pressure control module 511 adjusts the throttle to maintain an increased pressure differential (e.g., by maintaining an intake pressure<950 mBar) (step 605). In contrast, at lower engine operating points, the intake pressure control module 511 controls the throttle to maintain a lower pressure differential (step 607). Once a target pressure differential is determined from the look-up table, the intake pressure control module 511 adjusts the throttle based on the currently observed intake pressure (as indicated by the MAP sensor and the HFM sensor data).

FIG. 7 illustrates the operation of the IVO control module 513. The IVO control module regulates the intake valve timing based on the target engine speed and load. As illustrated in FIG. 7, the IVO control module 513 receives the target engine speed and load data (step 701) and determines a target intake valve timing corresponding to the target engine speed and load data based on a look-up table stored in memory. The controller 401 then operates the intake valve based on the target intake valve timing from the look-up table (step 703).

Figure 8:
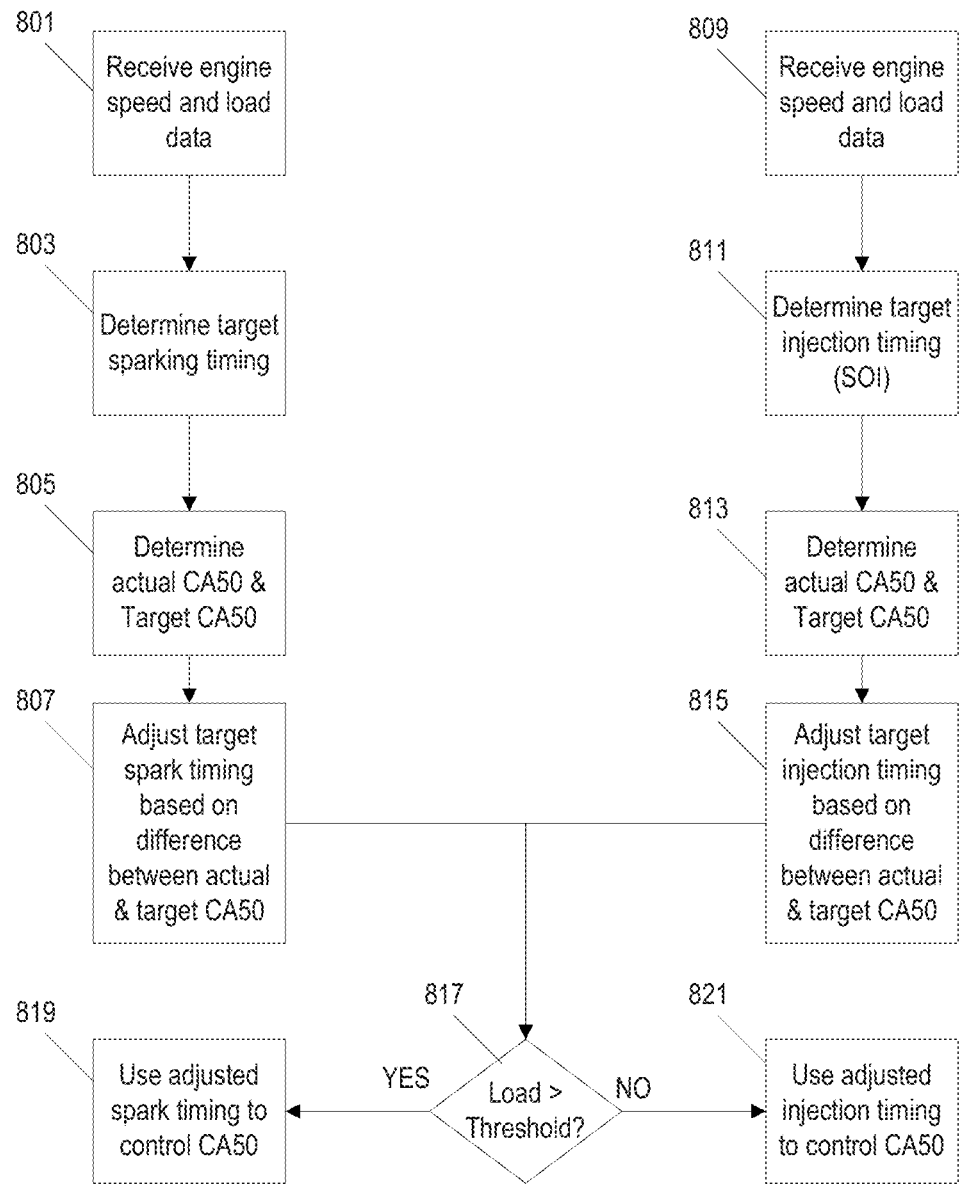
FIG. 8 is a flowchart of a method of controlling spark timing and injection timing according to the control structure of FIG. 5.

As noted above, because spark timing and injection timing are both used by the control structure of FIG. 5 to regulate combustion phasing (i.e., CA50), the spark control module 515 and the SOI control module 519 work in parallel to control the combustion phasing of the engine. FIG. 8 illustrates the operation of both modules 515, 519.

The spark control module 515 receives engine speed and load data (step 801) and determines a target spark timing corresponding to the engine speed and load from a look-up table stored in memory (step 803). The spark control module 515 then determines an actual combustion phasing (based on the output of an online cylinder pressure analysis (module 517)) and a target combustion phasing for the engine speed and load (also indicated by a stored look-up table) (step 805). The spark controller 515 uses a PID controller to adjust the target spark timing (as indicated by the look-up table) based on difference between the actual combustion phasing and the target combustion phasing (step 807).

At the same time, the SOI controller 519 also receives engine speed and load data (step 809) and determines a target injection timing corresponding to the engine speed and load data from a look-up table stored to memory (step 811). The SOI controller 519 also determines the actual combustion phasing and the target combustion phasing (step 813) and uses a PID controller to adjust the target injection timing based on the difference (step 815).

The control structure of FIG. 5 balances the control authority of the spark control module 515 and the SOI control module 519 based on the engine load (step 817). For higher loads (e.g., >3.25 bar BMEP, 1500 RPM), the control structure relies on the adjusted spark timing to control combustion phasing (step 819). For lower loads, the combustion phasing is regulated by adjusting the injection timing (step 821).

In the example of FIG. 8, the load is compared to a threshold (step 817) and only one of the spark timing or the injection timing is applied to regulate combustion phasing. However, in other constructions, the control authority is balanced between the two control modules 515, 519 on a more gradual scale. For example, the response time of the PID control loop for each control module can be adjusted to increase or decrease the control authority of the module. For example, at engine loads only slightly above the threshold, the PID control loop of the spark control module 515 can be adjust to respond slightly more quickly than the PID control loop of the SOI control module 519. As the load continues to increase, the response times are continuously adjusted until the spark control module 515 has full control authority over combustion phasing and the PID control loop of the SOI control module 519 is rendered inoperable. At that point, the SOI control module 519 simply applies the target injection timing as dictated by the look-up table and does not apply any adjustment based on the difference between the target and actual combustion phasing. In some constructions, this transition of control authority is a function of engine load at a given engine speed.

Figure 9:
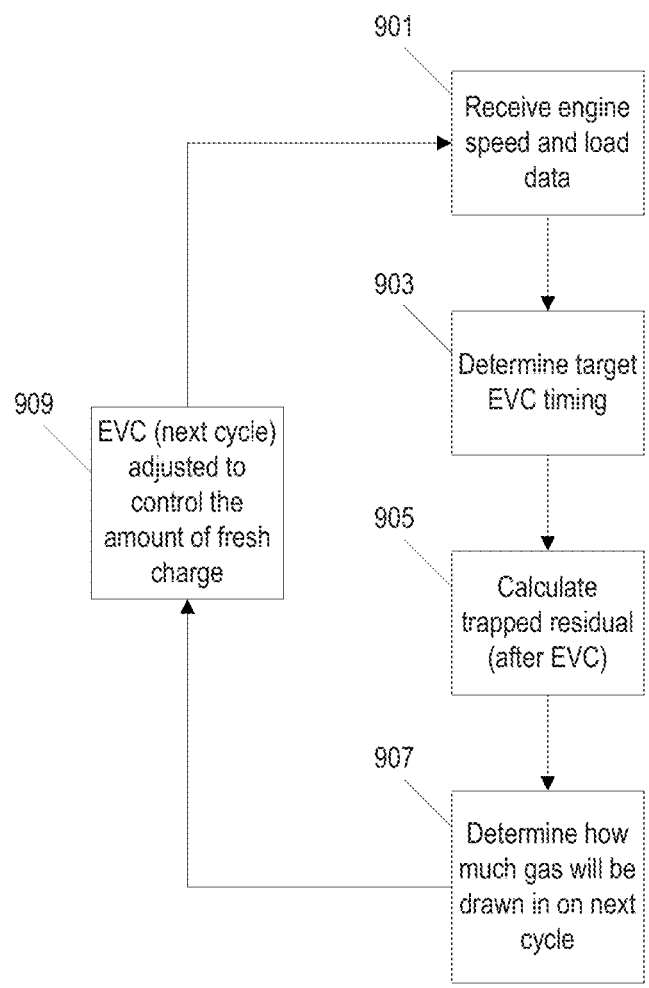
FIG. 9 is a flowchart of a method of controlling exhaust valve timing according to the control structure of FIG. 5.

FIG. 9 illustrates the operation of the EVC control module 521. As noted above, in this example, the timing of the exhaust valve closing is used as the primary load actuator of the engine. In other words, the exhaust valve timing is the actuator used to increase or decrease the torque provided by the engine. As illustrated in FIG. 9, the EVC control module 521 receives the engine speed and target load data (step 901) and determines an appropriate EVC timing corresponding to the target engine speed and load from a look-up table stored to memory (step 903). After applying the EVC timing, the controller 401 calculates a trapped residual in the engine cylinder after the exhaust valve is closed (step 905). This calculation is performed based on measured cylinder pressures and a gas exchange model that defines the flow of gases into and out of a cylinder based on various pressures, flow rates, and valve timings. The gas exchange model is also applied to determine how much gas will be drawn into the cylinder on the next combustion cycled (i.e., when the intake valve is opened) (step 907). The timing of the exhaust valve closing for the next combustion cycle is then adjusted to control the amount of fresh charge that will be introduced into the cylinder (step 909).

Using this control mechanism, the engine load can be changed by changing the timing of the exhaust valve closing. Adjusting the EVC timing changes the amount of internal residual that is trapped in the cylinder after the exhaust valve is closed. The amount of trapped residual directly influences the amount of gas (including a combination of fresh air charge and cEGR) to be inducted when the intake valve is opened during the subsequent combustion cycle.

Figure 10:
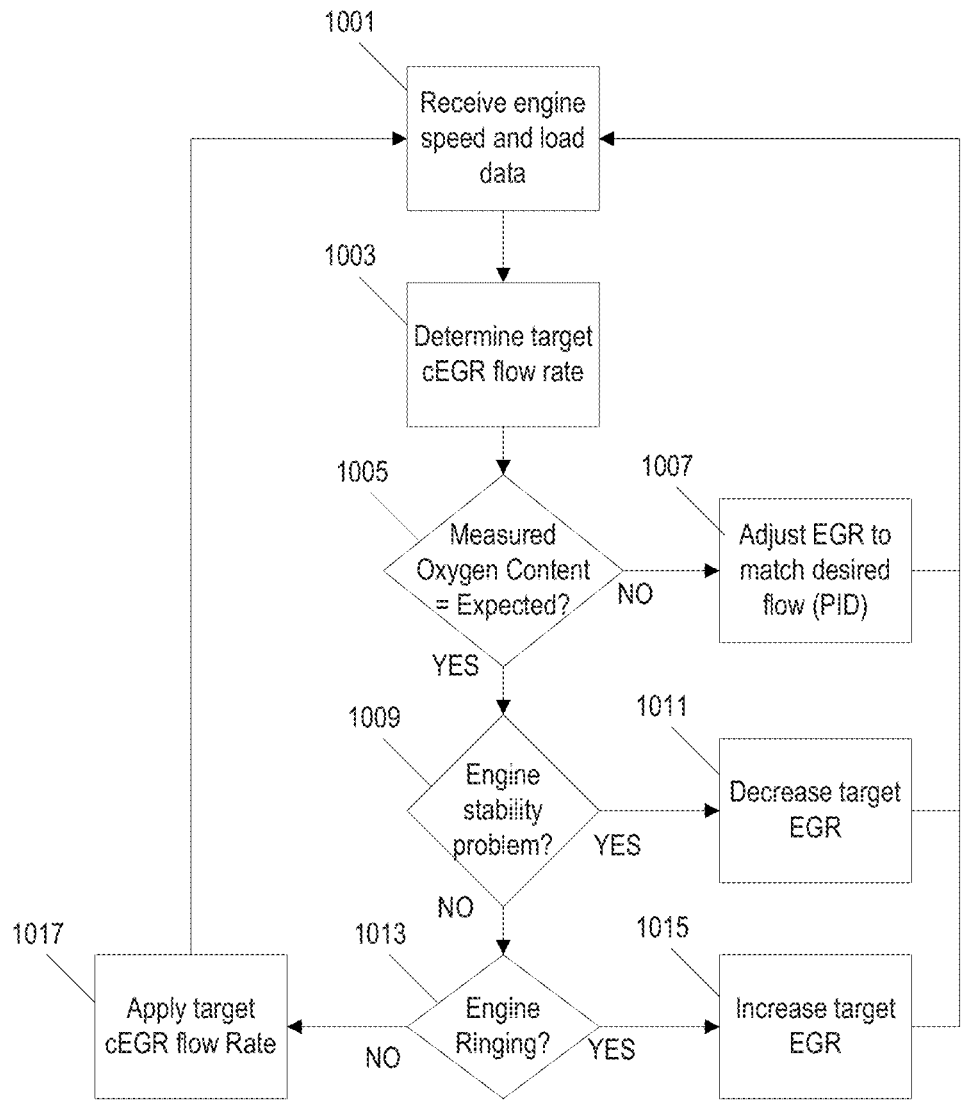
FIG. 10 is a flowchart of a method of controlling an exhaust gas recirculation (EGR) valve according to the control structure of FIG. 5.

FIG. 10 illustrates the operation of the cEGR control module 525. The cEGR control module 525 controls a valve to adjust the amount of cooled exhaust gas that is recirculated into the intake manifold of the engine based on (1) engine speed and load and (2) feedback from an intake manifold oxygen sensor (LSU IM). As illustrated in FIG. 10, the cEGR control module 525 receives engine speed and load data (step 1001) and determines a target cEGR flow rate corresponding to the engine speed and load from a look-up table stored to memory (step 1003). The cEGR control module 525 then compares the measured intake manifold oxygen content (from the LSU IM sensor) to the expected oxygen content (step 1005) and adjusts the EGR valve using a PID controller to achieve the target flow rate (step 1007).

The cEGR control module 525 also monitors engine operation and adjusts the cEGR flow rate to mitigate any detected problems. If engine stability is being negatively affected (step 1009), the target cEGR flow rate is decreased (step 1011). If engine ringing is detected (step 1013), the target cEGR flow rate is increased (step 1015). If no engine operation problems are detected and the measured intake oxygen content matches the expected oxygen content, then the target cEGR flow rate is applied (step 1017).

The target cEGR flow rate can also be used to control combustion duration. For example, the cEGR control module 525 can be configured to monitor the current engine combustion duration and to adjust the cEGR flow rate using a PID control loop to achieve a target combustion duration. Combustion duration and combustion phasing can be used together to characterize the combustion operation of the system.

As noted above, the EVC control module 525 controls the engine load by adjusting the timing of the exhaust valve closing. This adjustment changes the trapped internal residual in the cylinder and affects the amount of gas than can be drawn into the cylinder when the intake valve is opened. The goal of the EVC control module 525 is to regulate the amount of fresh air charge that is pulled into the cylinder. However, introduced air includes a combination of fresh air charge and cooled, recirculated exhaust gas from the cEGR system.

In order to properly regulate engine load by adjusting the exhaust valve timing, the EVC control module 521 must also receive feedback from the cEGR module 525. The cEGR flow rate as controlled by the cEGR control module 525 is used by the EVC control module 521 and the gas exchange model to determine the amount of fresh air charge that will be pulled into the cylinder when the intake valve is opened. The target EVC timing is then further adjusted based on this composition of gases at the intake manifold.

Thus, the invention provides, among other things, a system and method for controlling mixed-mode engine combustion by adjusting the timing of exhaust valve closing to regulate the amount of fresh air charge that is introduced into the cylinder when the intake valve is opened during the next combustion cycle. Various features and advantages of the invention are set forth in the following claims.

What is claimed is:

1. A method of controlling engine combustion, the method comprising:
   determining a target exhaust valve timing based on a first combination of engine speed and load;
   determining an amount of trapped residual in an engine cylinder after an exhaust valve is closed during a first combustion cycle;
   determining, based at least in part on the amount of trapped residual, an amount of gas that will be drawn into the engine cylinder when an intake valve is opened during a second combustion cycle; and
   adjusting the target exhaust valve timing during the second combustion cycle to adjust the amount of gas that will be drawn into the engine cylinder when the intake valve is opened during a third combustion cycle.

2. The method of claim 1, further comprising controlling a valve to adjust an amount of exhaust gas that is recirculated into an intake manifold of the engine.

3. The method of claim 2, wherein the act of determining the amount of gas that will be drawn into the engine cylinder when the intake valve is opened during the second combustion cycle includes
   determining the amount of exhaust gas that is recirculated into the intake manifold; and
   determining an amount of fresh charge that will be drawn into the engine cylinder when the intake valve is opened during the second combustion cycle based on the amount of exhaust gas that is recirculated into the intake manifold.

4. The method of claim 3, wherein the act of adjusting the target exhaust valve timing during the second combustion cycle to adjust the amount of gas that will be drawn into the engine cylinder when the intake valve is opened during the third combustion cycle includes
   adjusting the target exhaust valve timing during the second combustion cycle to adjust the amount of fresh charge that will be drawn into the engine cylinder when the intake valve is opened during the third combustion cycle.

5. The method of claim 2, further comprising:
   measuring an amount of oxygen in an intake manifold during the first combustion cycle; and
   determining a target amount of oxygen, and
   wherein the act of controlling the valve to adjust the amount of exhaust gas that is recirculated into the intake manifold of the engine includes
   controlling the valve to adjust the amount of exhaust gas that is recirculated into the intake manifold based at least in part on a difference between the measured amount of oxygen and the target amount of oxygen.

6. The method of claim 2, wherein the act of controlling the valve to adjust the amount of exhaust gas that is recirculated into the intake manifold of the engine includes
   controlling the valve to increase the amount of exhaust gas that is recirculated into the intake manifold of the engine when engine ringing is detected.

7. The method of claim 1, further comprising adjusting a throttle to maintain a target intake manifold pressure.

8. The method of claim 7, further comprising determining the target intake manifold pressure based on the first combination of engine speed and load.

9. The method of claim 1, further comprising adjusting a timing of intake valve opening based on the first combination of engine speed and load.

10. The method of claim 1, further comprising:
    determining a target combustion phasing for the engine;
    determining an actual combustion phasing for the engine based on measured cylinder pressure; and
    adjusting spark timing based on a difference between the target combustion phasing and the actual combustion phasing.

11. The method of claim 1, further comprising:
    determining a target combustion phasing for the engine;
    determining an actual combustion phasing for the engine based on measured cylinder pressure; and
    adjusting fuel injection timing based on a difference between the target combustion phasing and the actual combustion phasing.

12. The method of claim 1, further comprising adjusting combustion phasing of the engine by adjusting fuel injection timing and spark timing, wherein control authority over combustion phasing is transitioned between fuel injection timing and spark timing based at least in part on engine speed and engine load.

13. The method of claim 1, further comprising adjusting a combustion duration by adjusting a flow rate of recirculated exhaust gas into an intake manifold of the engine.

14. The method of claim 1, wherein the engine combustion achieved by spark-assisted compression ignition.

15. A combustion control system comprising a processor and a memory storing instructions that, when executed by the processor, cause the combustion control system to:
- determine a target exhaust valve timing based on a first combination of engine speed and load;
- determine an amount of trapped residual in an engine cylinder after an exhaust valve is closed during a first combustion cycle;
- determine, based at least in part on the amount of trapped residual, an amount of gas that will be drawn into the engine cylinder when an intake valve is opened during a second combustion cycle; and
- adjust the target exhaust valve timing during the second combustion cycle to adjust the amount of gas that will be drawn into the engine cylinder when the intake valve is opened during a third combustion cycle.

16. A method of controlling engine torque, the method comprising:
- determining an amount of fresh charge necessary to be drawn into an engine cylinder during a subsequent combustion cycle to achieve a target engine torque;
- determining an amount of trapped residual in an engine cylinder after an exhaust valve is closed during a previous combustion cycle;
- determining, based at least in part on the amount of trapped residual, an amount of fresh charge drawn into the cylinder when an intake valve is opened during a current combustion cycle; and
- adjusting a timing of exhaust valve closing during the current combustion cycle such that the amount of trapped residual in the engine cylinder after the exhaust valve is closed during the current combustion cycle is sufficient to allow the necessary amount of fresh charge to be drawn into the engine cylinder during the subsequent combustion cycle.

* * * * *